United States Patent [19]

Gheorghita

[11] Patent Number: 5,074,192
[45] Date of Patent: Dec. 24, 1991

[54] SUPPLY DEVICE AND PROCEDURE FOR PRESS ACTUATORS, WITH RECOVERY OF THE RAISING ENERGY

[75] Inventor: Victor Gheorghita, Castellanza, Italy

[73] Assignee: Pomini Farrel S.P.A., Castellanza, Italy

[21] Appl. No.: 348,304

[22] Filed: May 5, 1989

[30] Foreign Application Priority Data

May 6, 1988 [IT] Italy .................... 20486 A/88

[51] Int. Cl.$^5$ ............................................. F15B 15/22
[52] U.S. Cl. .................................... 91/407; 91/436; 91/443; 91/437; 91/399
[58] Field of Search ............. 91/405, 407, 420, 436, 91/443, 461, 437, 438, 439, 448, 465, 361, 399, 406, 463

[56] References Cited

U.S. PATENT DOCUMENTS

| | | | |
|---|---|---|---|
| 3,396,635 | 8/1968 | Darling | 91/436 |
| 3,452,645 | 7/1969 | Barltrop | 91/437 X |
| 3,537,356 | 11/1970 | Odell | 91/436 X |
| 3,608,431 | 9/1971 | Pease | 91/437 X |
| 3,724,331 | 4/1973 | Kobayashi | 91/407 |
| 4,033,250 | 7/1977 | Pinkstaff | 91/405 X |
| 4,205,591 | 6/1980 | Mickelson | 91/420 X |
| 4,250,794 | 2/1981 | Haak et al. | 91/420 |
| 4,359,931 | 11/1982 | Palmersheim et al. | 91/436 |
| 4,416,187 | 11/1983 | Nystrom | 91/361 |
| 4,616,727 | 10/1986 | Kircher et al. | 91/438 X |
| 4,628,499 | 12/1986 | Hammett | 91/361 X |
| 4,718,329 | 1/1988 | Nakajima et al. | 91/445 |
| 4,813,335 | 3/1989 | Wakiya et al. | 91/361 |
| 4,840,111 | 6/1989 | Garnjost | 91/436 |
| 4,869,460 | 9/1989 | Kocsanyl et al. | 91/407 X |
| 4,896,582 | 1/1990 | Tordenmalm et al. | 91/461 X |

FOREIGN PATENT DOCUMENTS

| | | | |
|---|---|---|---|
| 2908583 | 9/1980 | Fed. Rep. of Germany | 91/405 |
| 2053419 | 2/1981 | United Kingdom | 91/438 |

Primary Examiner—Edward K. Look
Assistant Examiner—John Ryznic
Attorney, Agent, or Firm—Herbert Dubno; Yuri Kateshou

[57] ABSTRACT

Device and procedure for the supply, with recovery of the raising energy, of press actuators having a cylinder within which a piston delimits two chambers, namely an upper and a lower chamber, which are supplied with pneumatic power, the said device having a pneumatic control unit connected to the mains and including at least one supply line to the upper chamber of the actuator and one supply line to the lower chamber of the actuator, these lines having supply and discharge valves, in which device the supply lines to the chambers of the actuator pass through an economizer unit interposed between the control unit and the actuator and including a servocontrolled valve which intercepts the supply line to the upper chamber, a servocontrolled valve which intercepts the supply line to the lower chamber, and a connecting pipe between the supply line of the lower chamber and that of the upper chamber, downstream of the said intercepting valves, and provided with its own servocontrolled intercepting valve, while means of detecting the position of the actuator piston are provided, are functionally connected to the servocontrolled valves, and can cause the opening and closing of these valves in successive phases of the movement of the piston.

3 Claims, 8 Drawing Sheets

SUPPLY DEVICE AND PROCEDURE FOR PRESS ACTUATORS, WITH RECOVERY OF THE RAISING ENERGY

FIELD OF THE INVENTION

The present invention relates to a supply device, with recovery of the raising energy, for press actuators, and the associated automatic operating procedure. The invention also relates to a method for carrying out the apparatus.

BACKGROUND OF THE INVENTION

For certain operations and manufacturing processes, pneumatic actuators are used to perform pressing functions in which part of the pressing stroke, known as the approach stroke or the idle stroke, is completed without encountering any specific resistance, while the remainder of the stroke, described hereafter as the active stroke, requires a particular predetermined thrust force.

A specific case of this kind is that of internal mixers for rubber and elastomers, in which a pressing weight has to be raised by a corresponding pneumatic actuator, to make it possible to open the loading hatch for the material to be processed, and then lowered until it comes into contact with the loaded material and then presses it into the mixing chamber with a predetermined degree of pressure to permit complete processing of all the material. In this case a large amount of compressed air, supplied to the upper chamber of the actuator, is required to complete a stroke, part of which is necessary only to lower the weight connected to the actuator after it has been raised to open the access hatch of the mixing chamber, while the part of the stroke in which active pressure is required is limited. The necessity of supplying large volumes of compressed air entails high costs for the pneumatic equipment and high energy consumption by this equipment.

OBJECTS OF THE INVENTION

It is therefore an object of the present invention to provide an improved supply device saving the compressed air required for a manufacturing cycle by limiting the quantity required from the compressor.

Another object is the reduction of the actuator movement times, which enables output to be increased.

SUMMARY OF THE INVENTION

These results are obtained by a supply device according to the invention for recovery of the raising energy for press actuators having a cylinder inside which a piston delimits two chambers, namely an upper and a lower chamber, with a pneumatic power supply and provided with corresponding supply and discharge valves in which the supply lines to the actuator chambers pass through an economizer unit which is interposed between the control unit and the actuator and which includes a servocontrolled valve intercepting the supply line to the upper chamber, a servocontrolled valve intercepting the supply line to the lower chamber, and a connecting pipe between the supply line of the lower chamber and that of the upper chamber. Downstream from the interception valves of these lines the device is provided with a servocontrolled interception valve and with detectors of the position of the predetermined actuator piston position which are functionally connected to the servocontrolled valved and are capable of bringing about the opening and closing of the valves in successive phases of the piston movement. The detectors of the position of the actuator piston include at least one detector of the actuator piston position, located at an intermediate point of the piston stroke and capable of bringing about, when actuated in the descending phase of the piston, the closing of the valve intercepting the connection line between the supply units of the piston chambers and the opening of the interception valves of the chamber supply lines connected with the corresponding supply and discharge lines of the control unit.

The control unit includes pneumatic means for braking the descending stroke of the actuator piston and means for detecting the position of the actuator piston comprising a detector of the piston position located at a level above the lowest level of descent and capable of controlling the activation of the braking means.

The economizer unit is located at a short distance from the actuator and includes pipes and valves with a wide passage section which induce negligible pressure drops in the pneumatic flow.

The servocontrolled valves may conveniently be spherical valves, each provided with a servocontrol actuator supplied from a corresponding electromagnetic valve in connection with external means of monitoring and control.

A press actuator control method according to the invention, includes steps of detecting different intermediate positions of the piston accompanied by switching respective valves on and off and by actuating discharging means in response to a control signal from one of the sensors.

The active descending phase with a particular combination of valves includes the connection of the upper chamber of the actuator with a pneumatic supply source at predetermined pressure, or alternatively, includes the expansion of the intercepted air inside the upper chamber of the piston.

The active descending phase may include an automatic terminal braking step, in which the discharge line from the lower chamber of the actuator to the atmosphere is throttled.

BRIEF DESCRIPTION OF THE DRAWING

The above and other objects, features and advantages will become readily apparent from the following, reference being made to the accompanying highly diagrammatic drawing in which.

SPECIFIC DESCRIPTION

Figure 1:
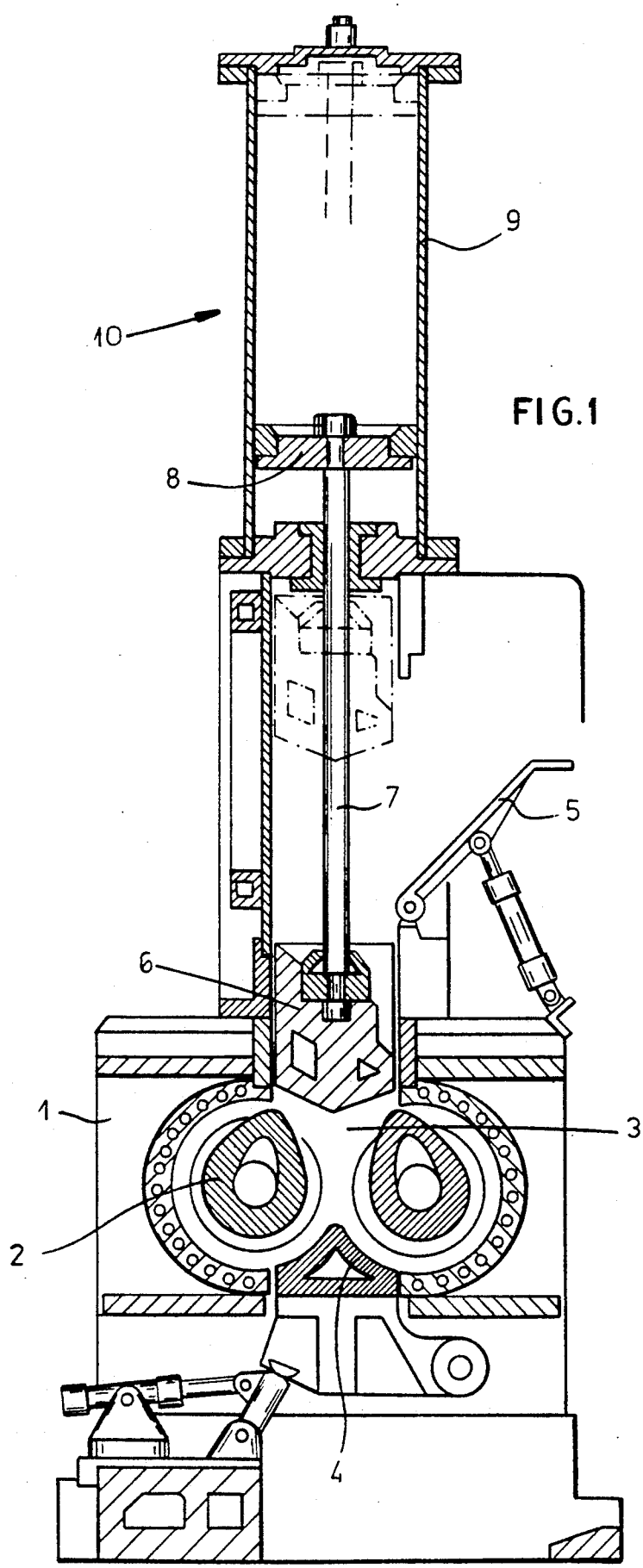
FIG. 1 is an internal mixer of a type suitable for the application of the device according to the invention.

As FIG. 1 shows an internal mixer for the preparation of rubber, elastomer and similar mixes includes a body 1 containing rotors 2 capable of mixing the material inside a chamber 3; a discharge hatch 4 allowing the material to be removed after processing, while a loading port 5 permitting the ingress of the materials to be mixed, these materials are impelled into the chamber 3 by means of a pressing weight 6, represented by a solid line in its completely lowered position and by a broken line in its raised position.

The pressing weight 6 is connected by a shaft 7 to a piston 8 which can slide inside a cylinder 9, in which it delimits an upper and a lower chamber; by means of the piston 8, the weight 6 may be raised for loading and lowered for the compression of the material to be processed.

The piston 8 and the cylinder 9 form an actuator, indicated in its entirety by the number 10, which is supplied with pneumatic power to perform the above operations of raising and pressing.

Figure 2:
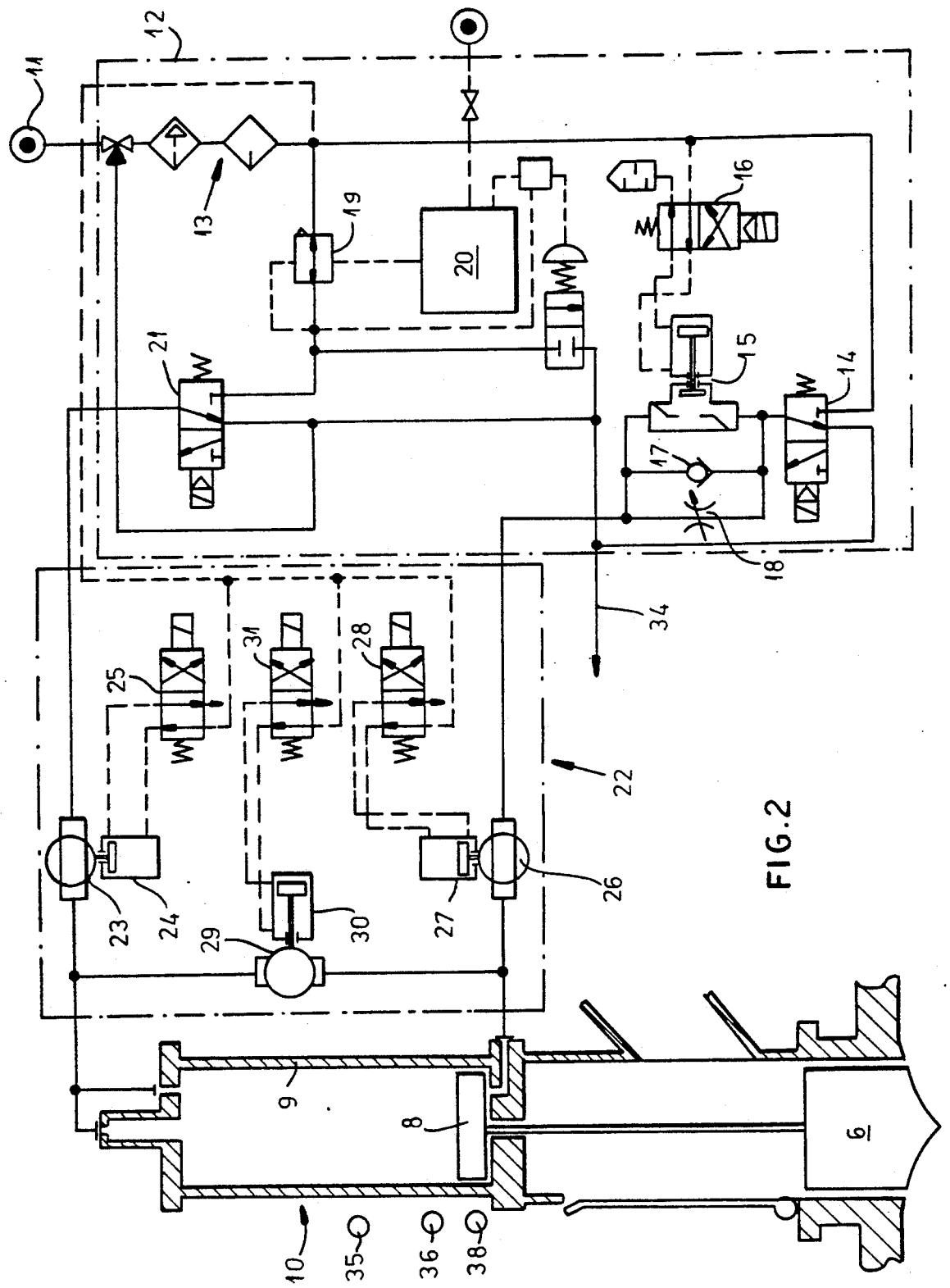
FIG. 2 is a pneumatic diagram of the supply device for the press actuator for the mixer according to the invention, in the phase of raising the pressing weight.
Figure 3:
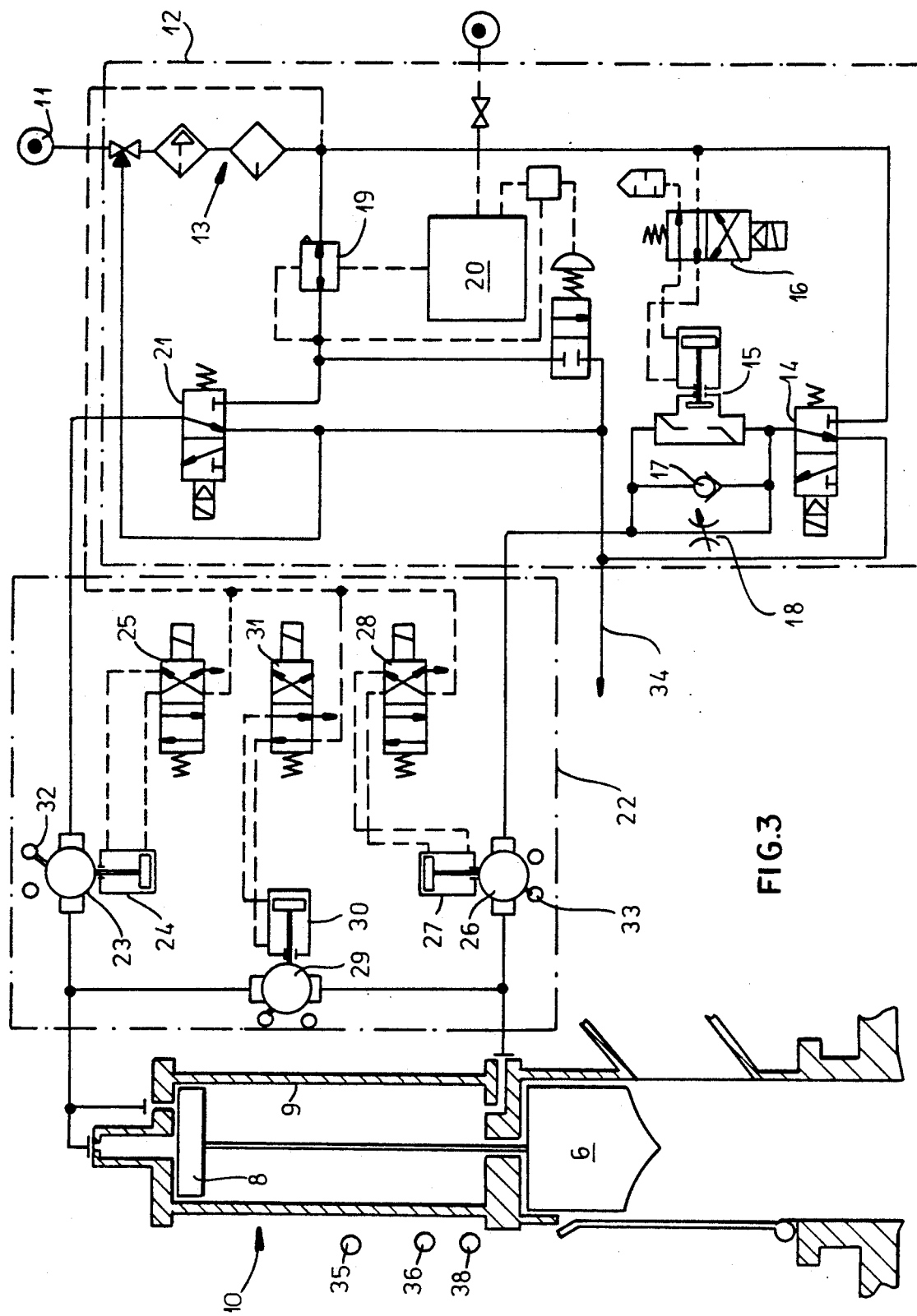
FIG. 3 is a pneumatic diagram of the supply device for the press actuator for the mixer according to the invention, in the phase of preparation for the descent of the weight.
Figure 8:
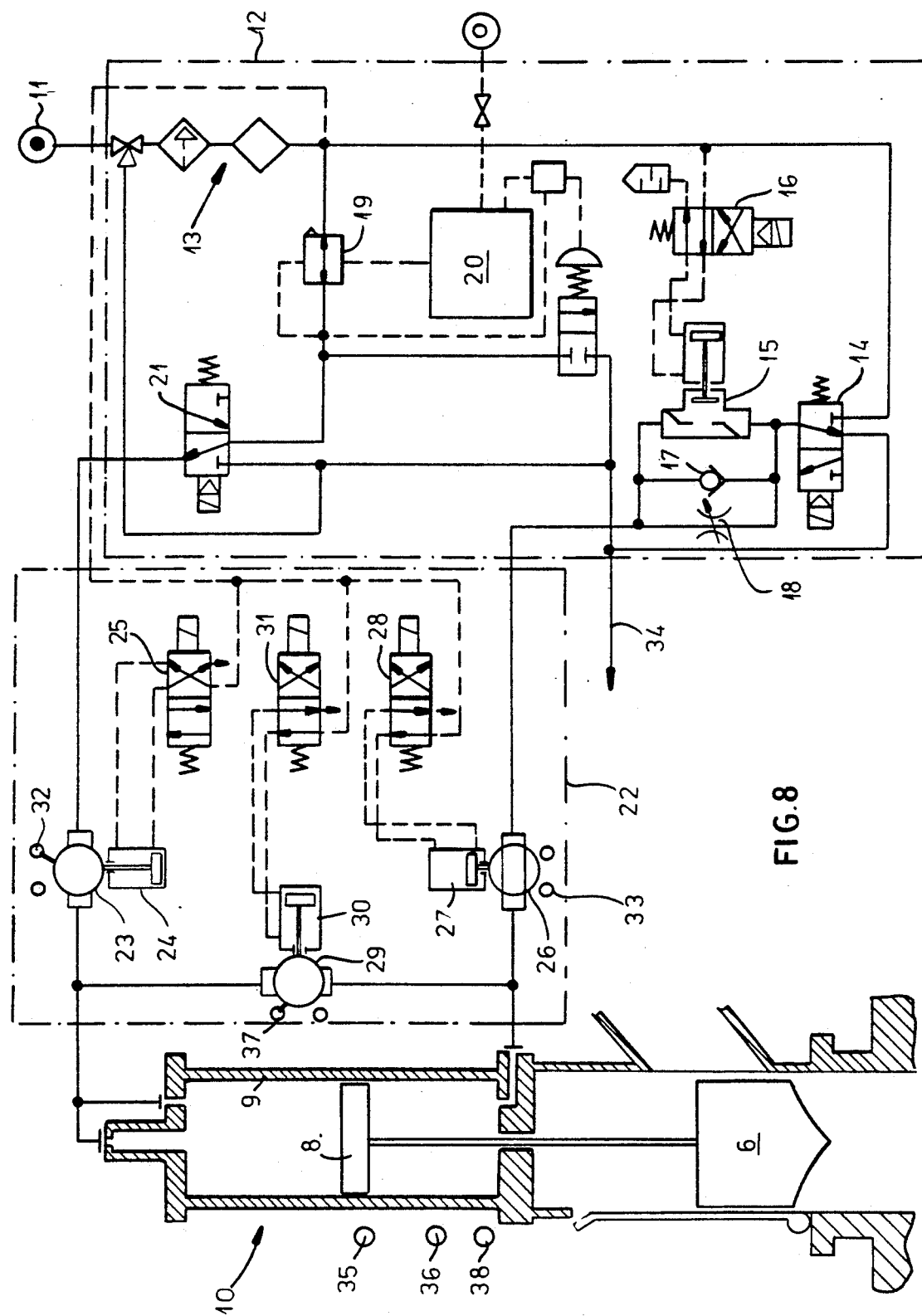
FIG. 8 is the phase of compression according to the present invention of the material being mixed at reduced pressure with energy recovery.

For the supply of the actuator 10, a pneumatic circuit is provided, a diagram of which is shown in FIG. 2 in the phase of raising the weight and FIGS. 3 and 8 show successive phases of descending and pressing.

According to this diagram, the pneumatic actuator 10 is supplied from the pneumatic main supply 11 through a master control unit 12, of a known type, including a lubrication and condensation separation unit 13, downstream from which the supply line to the lower chamber of the cylinder includes an electromagnetic valve 14, a valve 15 which is pneumatically controlled by the electromagnetic valve 16, a non-return valve 17 and a throttle 18; the supply line to the upper chamber of the cylinder includes a pressure reducer 19 operated by a selector 20 at the desired pressure level, and an electromagnetic valve 21.

The economizer unit 22 is supplied from the control unit 12 and includes a valve 23, located in the supply line leading to the upper chamber of the cylinder and controlled through a pneumatic servocontroller 24 by an electromagnetic valve 25; a valve 26, located in the supply line leading to the lower chamber of the cylinder and controlled through a pneumatic servocontroller 27 by an electromagnetic valve 28; and a valve 29, interconnecting the supply lines to the chambers of the cylinder, and controlled through a pneumatic servocontroller 30 by an electromagnetic valve 31.

For operation without the use of the economizer unit, valves 23, 26 and 29 are set in the position shown in FIG. 2, namely with valves 23 and 26 open and valve 29 closed: in this case the control unit 12 supplies the actuator directly, as if it would be directly connected to it, without the invention of the unit 22.

The system is kept in this configuration, as shown in FIG. 2 during the raising of the piston 8 and the weight 6.

By energizing the electromagnetic valve 14 and thus opening it, air is supplied through unit 12 to the lower chamber of the cylinder, while the upper chamber is connected through valve 21 to the discharge pipe, so that the piston 8 begins to rise and is then maintained in the raised position at the top of its stroke.

The piston 8 may be lifted at the maximum speed permitted by the available pressure, since there is a free flow through valves 15 and 17 and the throttle 18.

Figure 4:
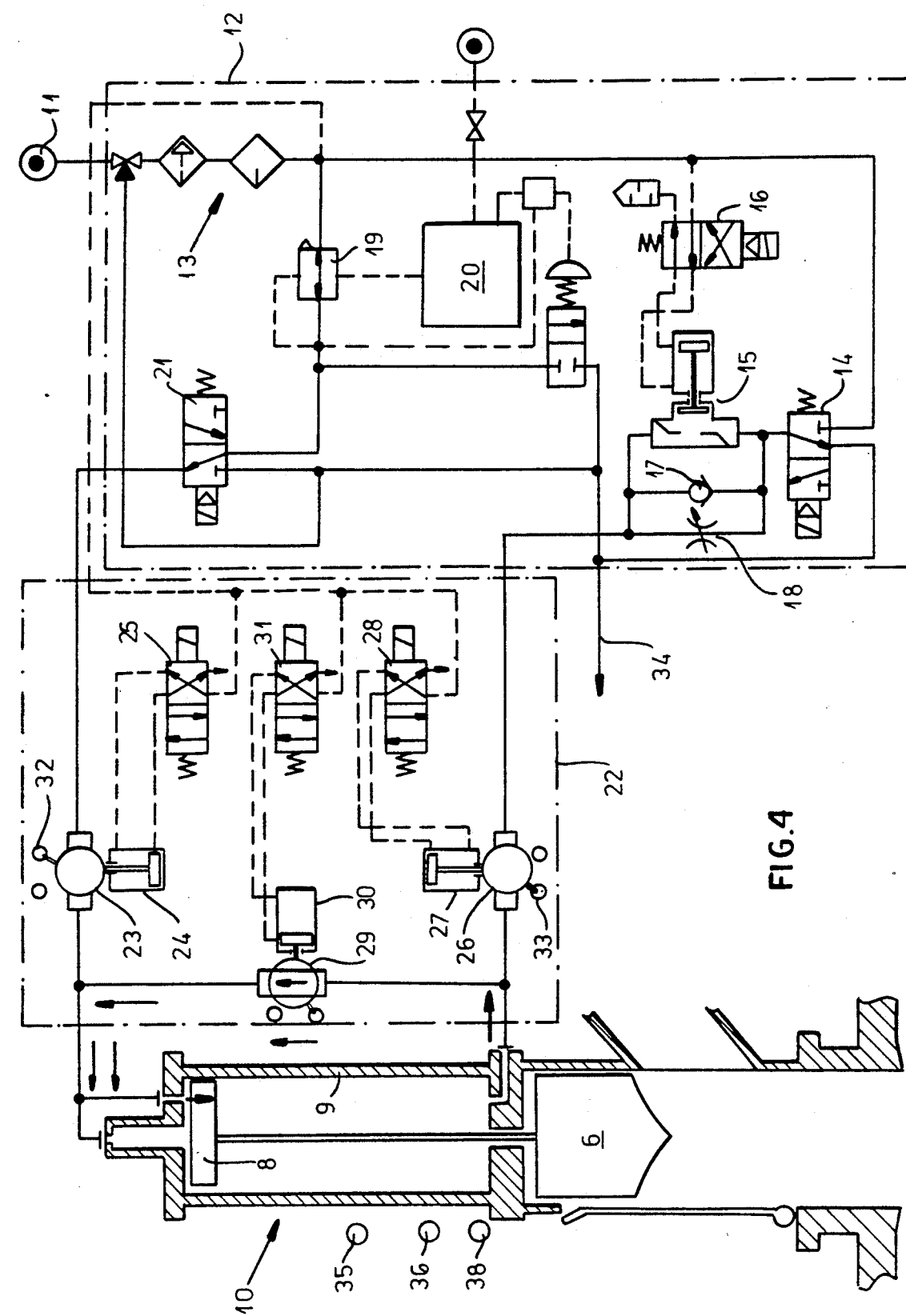
FIG. 4 is the phase of descent of the weight with energy recovery.

In order to initiate the descent of the piston 8 with recovery of the energy, the electromagnetic valves 25 and 28 are energized to close valves 23 and 26, as shown in FIG. 3: The position indicators 32 and 33, relating to valves 23 and 26 respectively, permit the energizing of the electromagnetic valve 31 upon emitting valves 23 and 26 causing the valve 29 to open as illustrated in FIG. 4. The electromagnetic valve 14 returns to its de-energized position, connected to the discharge pipe 34, and the electromagnetic valve 21 is energized, thus connecting the supply pipe to the upper chamber of the cylinder to the pneumatic mains and, consequently, preparing the control unit 12 for the initiation of the active descent of the weight.

The compressed air, contained in the lower chamber of the cylinder 9 and previously isolated from the mains pressure, is transferred to the upper chamber of the cylinder, as shown by the arrows in FIG. 4, by means of the kinetic energy of the descending weight and the positive difference between the forces acting on the opposing surfaces of the piston.

In this phase, it is possible to arrest the descent of the weigh in any intermediate position by de-energizing the electromagnetic valve 31, thus closing valve 29 and consequently interrupting the transfer of air form one chamber of the cylinder to the other.

Having passed through a predetermined section of the descending stroke, the piston 8 actuates the first positioning means including a sensor 35, which causes the electromagnetic valve 31 to be de-energized and valve 29 to be closed.

Figure 5:
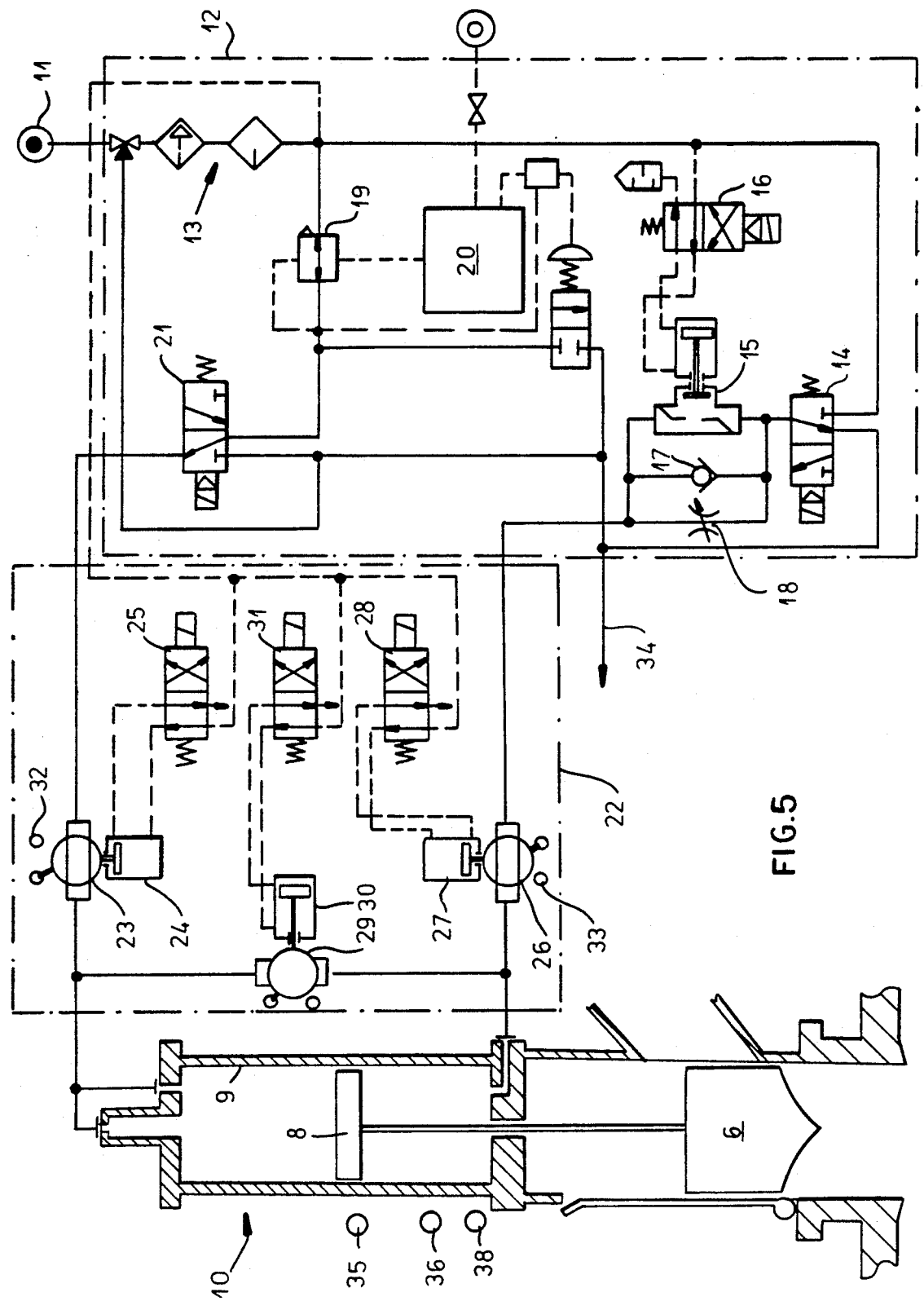
FIG. 5 is the final phase of the descent according to the present invention with energy recovery.

Subsequently the electromagnetic valves 25 and 28 are energized, thus causing valves 23 and 26 to open as shown in FIG. 5.

In this position the actuator 10 is connected to the control unit 12, and permits the actuator to be activated with the maximum specified thrust, depending on the available pressure level, to compress the material within the chamber 3 of the mixer.

Figure 6:
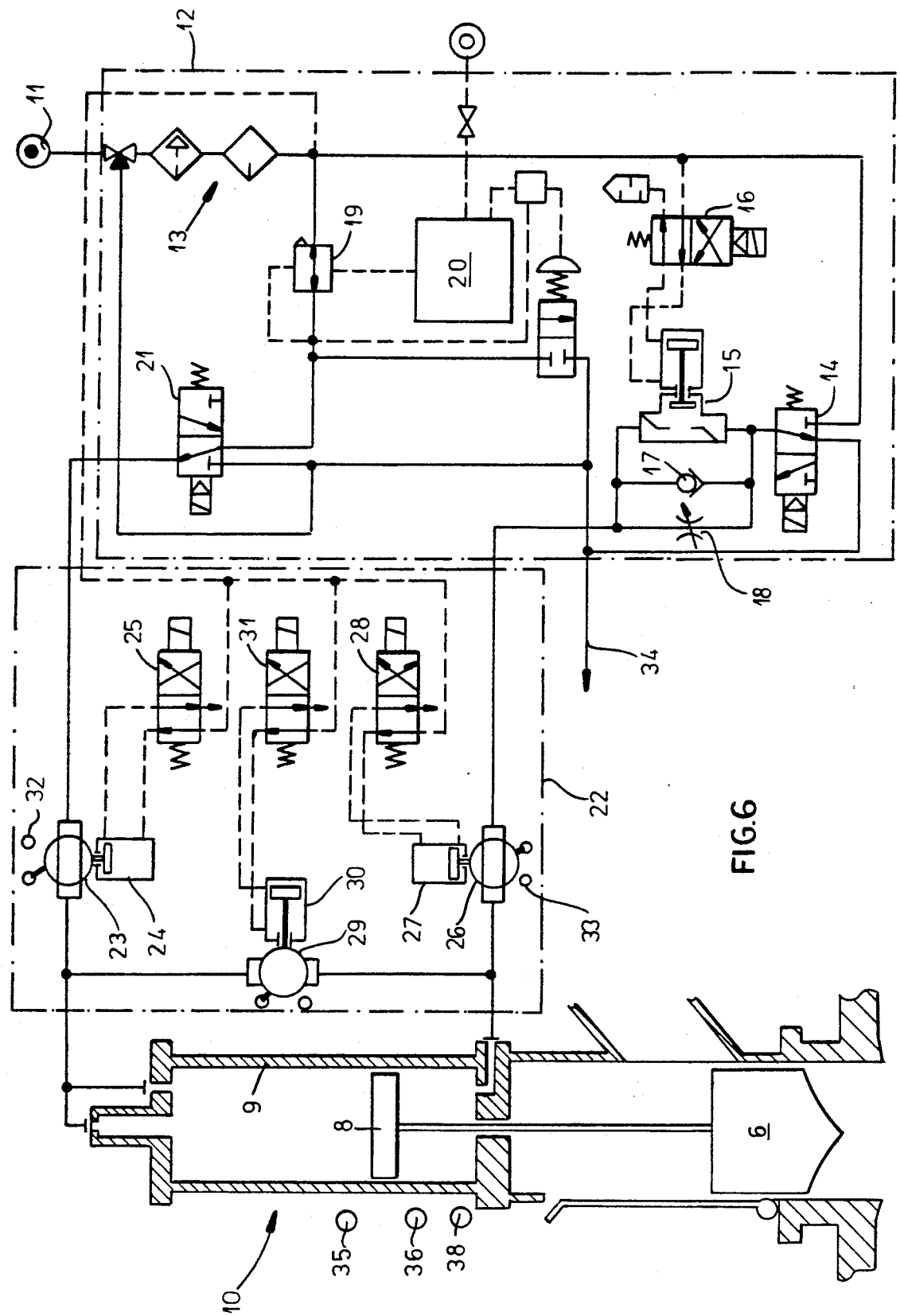
FIG. 6 is the phase of compression according to the present invention of the material being mixed.

The compression, represented in the diagram in FIG. 6, is obtained by supplying compressed air from the main source to the upper chamber of the cylinder 9 through the electromagnetic valve 21 and the valve 23 which is open the air contained in the lower chamber of the cylinder is discharged to the atmosphere through the controlled valve 15, the electromagnetic valve 14, and the discharge pipe 34.

Figure 7:
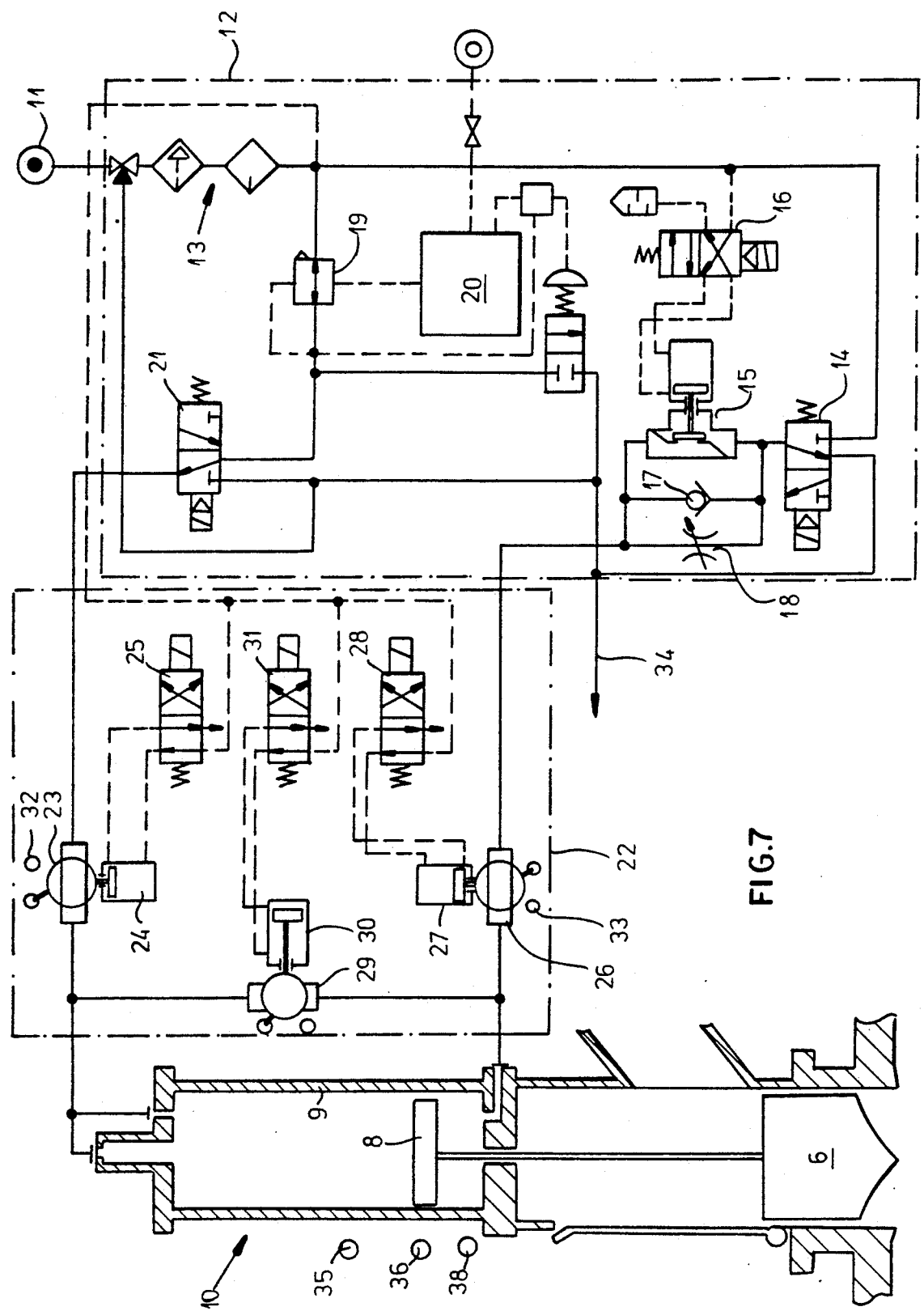
FIG. 7 is the phase of braking the descent according to the present invention.

When the piston 8 reaches the second positioning means including sensor 36, as shown in FIG. 7, this device activates the electromagnetic valve 16, which causes the valve 15 to close; the outflow of air through the lower chamber of the cylinder 9 is then permitted only through the throttle 18, which thus brakes the descent for the remaining part of the stroke to the position of complete lowering of the weight.

Upon reaching the lowest position, the piston is kept in place, valve 21 energized, for the time necessary for the completion of mixing; after this, the electromagnetic valve 21 is de-energized, permitting the air contained in the upper chamber of the cylinder to be discharged to the atmosphere through the pipe 34, and a new cycle may then be initiated, with the complete raising of the 8 and of the weight 6, as described previously.

From the above description it may be seen that for each cycle during the raising phase a certain volume of compressed air contained in the cylinder is discharged to the atmosphere, while during the lowering phase a volume of compressed air equal to approximately a third of the previous amount is discharged into the atmosphere.

This makes it possible to save 70% of the air for each descent and approximately 33% of the compressed air for the whole cycle as compared with operation without the economizer unit.

If the descent of the weight is controlled in its active phase at a pressure less than the maximum mains pressure at which the raising is performed, it is possible also to obtain a saving of compressed air in the active section of the piston stroke below the end-of-travel device 35, by making use of the expansion of the compressed air present in the upper chamber of cylinder 9 throughout the piston stroke.

For this purpose, as shown in FIG. 8, when the end-of-travel device 35 is activated the electromagnetic valve 31 is de-energized, causing the valve 29 to close; when the valve 29 is closed, the position indicator 37 associated with the shutter of the valve 29 permits the energizing of the electromagnetic valve 28, which causes valve 26 to open, thus discharging to the atmosphere, through the pipe 34, the remaining air contained in the lower chamber of the cylinder.

In this way the air pressure present in the lower chamber of the cylinder is no longer opposed and enables the remainder of the descending stroke to be completed.

On completion of the descent, with its braking phase as described previously, the end-of-travel device 38 is activated, and this causes the electromagnetic valve 25 to be energized, which opens the valve 23, thus restoring the configuration shown in FIG. 2.

In both possible modes of operation described, that is, either with active descent in connection with the pneumatic mains or with active descent with expansion of the air in the upper chamber, a time-delay relay is provided in parallel with the end-of-travel device 35, and operates to initiated the active phase of descent after a predetermined time, even if the position corresponding to the activation of the end-of-travel device 35 has not yet been reached by the piston, or in any other case in which the end-of-travel device 35 fails to operate.

The device according to the invention is also advantageous with respect to the descent time of the weight, since the communication between the upper and the lower chamber of the cylinder through the valve 29 is quite short and presents insignificant resistance, permitting a descent velocity during this phase which is to be considerably greater than that and which would be obtained if air were supplied at a level of the main pressure through the electromagnetic valve 21 and the valve 23 and the air were discharged from the lower chamber through the valve 15 and the pipe 34.

The gain in time in the descending stroke is of the order of 25%.

Consequently, as a result of the saving of compressed air which is achieved, the device according to the invention, ad its automatic operating procedure, can be used to reduce the capacity of the compressors, to reduce the consumption of electrical energy, and to reduce the initial installation costs, since equipment of smaller dimensions can be installed; the presence of the economizer group also makes it possible, by closing the valves 23, 26, 29, to reliably lock the piston at any intermediate point operations to be performed in safe conditions.

The economizer device according to the invention, described in detail in relation to a particular control unit, may also be applied to different control units while remaining within the scope of the present invention.

The economizer unit may also be realized in a different form, for example, is the use of multi-acting valves. Other variations may be made in accordance with specific applications, while still remaining within the ambit of the invention in its general characteristics.

I claim:

1. A device for operating a press actuator, comprising:
   an external source of a pressurizing medium;
   a cylinder operatively connected with said source;
   a piston axially slidable in said cylinder between a first extreme axial position limiting a return stroke of said piston and a second extreme axial position limiting a working stroke thereof, said piston dividing said cylinder into a first chamber and a second chamber;
   means for providing a flow of said pressure medium located between said source and said cylinder, said means including:
   a first line and a second line extending between said source and the respective first and second chamber of said cylinder, each of said lines being provided with respective means for selectively supplying and discharging said medium from the respective chamber, said supplying and discharging means intercepting said second line including pneumatic means for breaking said working stroke;
   means for controlling the flow of said medium into said chambers located between said means for supplying and said cylinder, said means for controlling including:
   a first fluid servocontrolled valve intercepting said first line downstream of the respective means for supplying and discharging.
   a second fluid servocontrolled valve intercepting the second line downstream of the respective means for supplying and discharging,
   a third fluid servocontrolled valve intercepting a third line interconnecting said first and second lines downstream of said first and second servocontrolled valves; and
   means for detecting predetermined axial positions of said piston during the working stroke operatively connected with pneumatic means and with said first, second and third servocontrolled valves, said means for detecting including:
   a first positioning sensor controlling a first predetermined axial intermediate axial position of said piston between said firs and second extreme axial positions, said third fluid servocontrolled valve being open during the working stroke of the piston between the first axial extreme and first axial intermediate positions, so that said fluid flows freely between the chambers, said first positioning sensor closing said third servocontrolled valve and opening respective first and second servocontrolled valves for discharging said medium from said second chamber, said pneumatic means including a throttle intercepting said second line downstream of said second valve and a pneumatic valve, said medium flowing freely through said pneumatic valve upon reaching said first intermediate axial position by said piston during said working stroke, a second positioning sensor controlling a second predetermined axial intermediate position of said piston between said first intermediate and second extreme positions, said second positioning sensor closing said pneumatic valve, said medium being discharged through said throttle breaking said working stroke, and a third positioning sensor controlling said second extreme axial position and switching said first servocontrolled valve upon reaching said third sensor by said piston, said second servocontrolled valve and said pneumatic valve being open upon reaching said second extreme position by said piston, said medium being discharged freely into the atmosphere through said second pneumatic valve, so that a material is compressed within a chamber during the working stroke of said piston.

2. The device defined in claim 1 wherein said pneumatic means further include an electromagnetic valve operatively connected with said second sensor and controlling said pneumatic valve connected in parallel with said throttle intercepting said second line upstream of said second valve, said first, second and third fluid servocontrolled valves being controlled by respective first, second and third electrically operated servovalves operatively connected with said positioning sensors and with said electromagnetic valve.

3. A method for operating a press actuator including a piston and cylinder unit having a piston slidable axially in a cylinder between first and second extreme axial positions thereof and provided with a rod extending through a bottom of said cylinder, said rod being provided with a ram mounted on a free end thereof, said piston subdividing said cylinder into a first chamber and a second chamber connected with respective first and second servocontrolled valves, said method comprising the steps of:

(a) supplying a pressure medium from an external source into the second chamber of the cylinder thereby generating a return stroke of a piston located at a second extreme axial position thereof;

(b) closing first and second servocontrolled valves while opening a third servocontrolled valve thereby initiating an idle phase of a working stroke of the piston upon gravity of the ram forcing said medium to flow freely through said third servocontrolled valve between the chambers;

(c) detecting a first predetermined intermediate axial position of the piston between the first and second extreme axial positions and generating a first axial position signal corresponding thereto and opening first and second servocontrolled valves upon closing the third servocontrolled valve interconnecting the first and second servocontrolled valves;

(d) detecting a second predetermined intermediate axial position of the piston between the first intermediate and second extreme axial positions and generating a second axial position signal corresponding to the second intermediate signal position and closing the third servocontrolled valve and opening the first and second servocontrolled valves;

(e) closing a pneumatic control valve located downstream of the second servocontrolled valve upon generating the second axial position signal in step (d);

(g) discharging the pressure medium from the second chamber through a throttle connected in parallel with the pneumatic control valve during closing of control valve in step (e) thereby gradually braking the working stroke; and (h) detecting the second extreme axial position of the piston and generating a third axial position signal corresponding to the second extreme axial position and closing the first servocontrolled valve while leaving the second servocontrolled and pneumatic valves open thereby terminating the working stroke upon discharging said medium flowing freely through said pneumatic valve.

* * * * *